Patented Sept. 25, 1928.

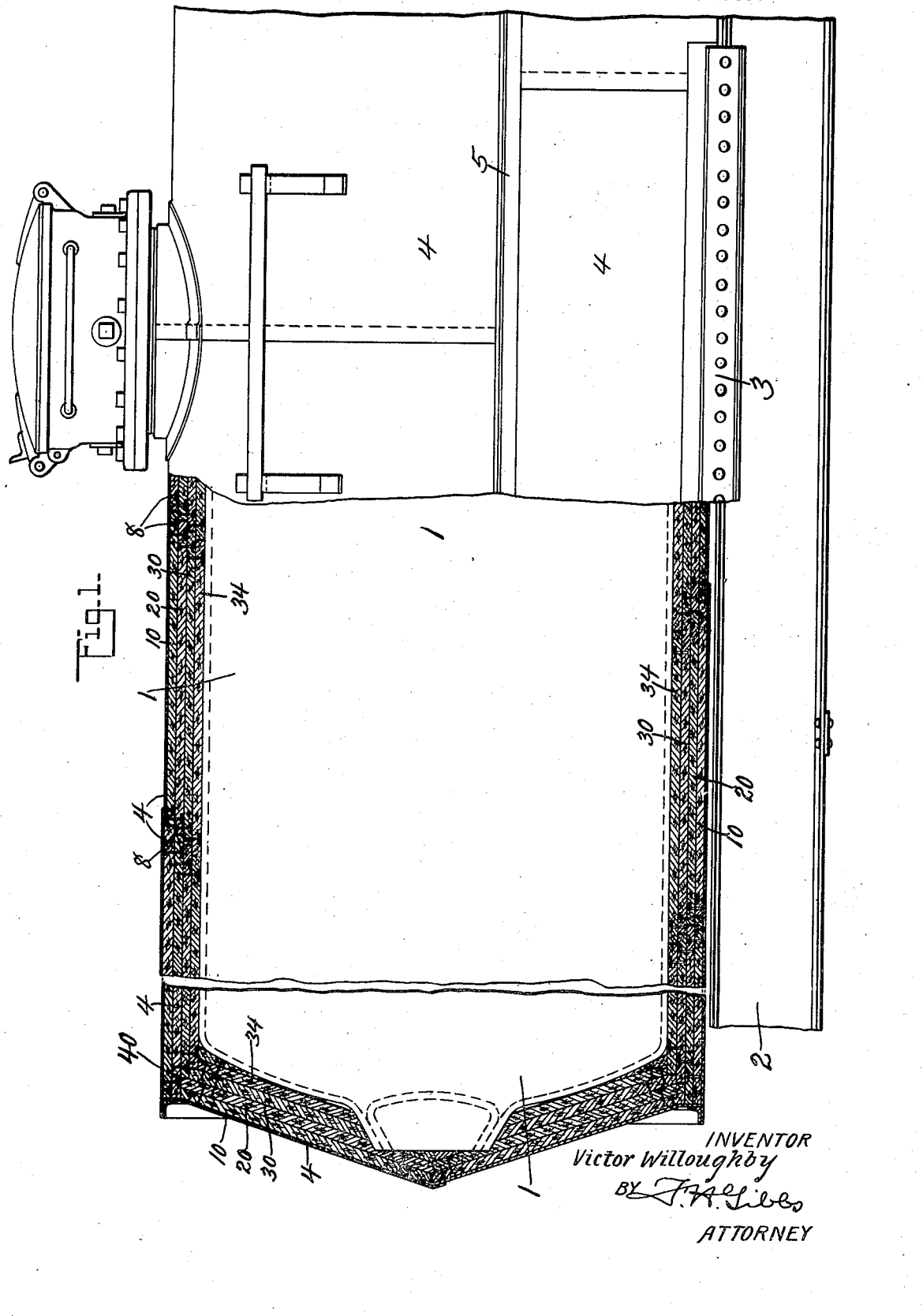

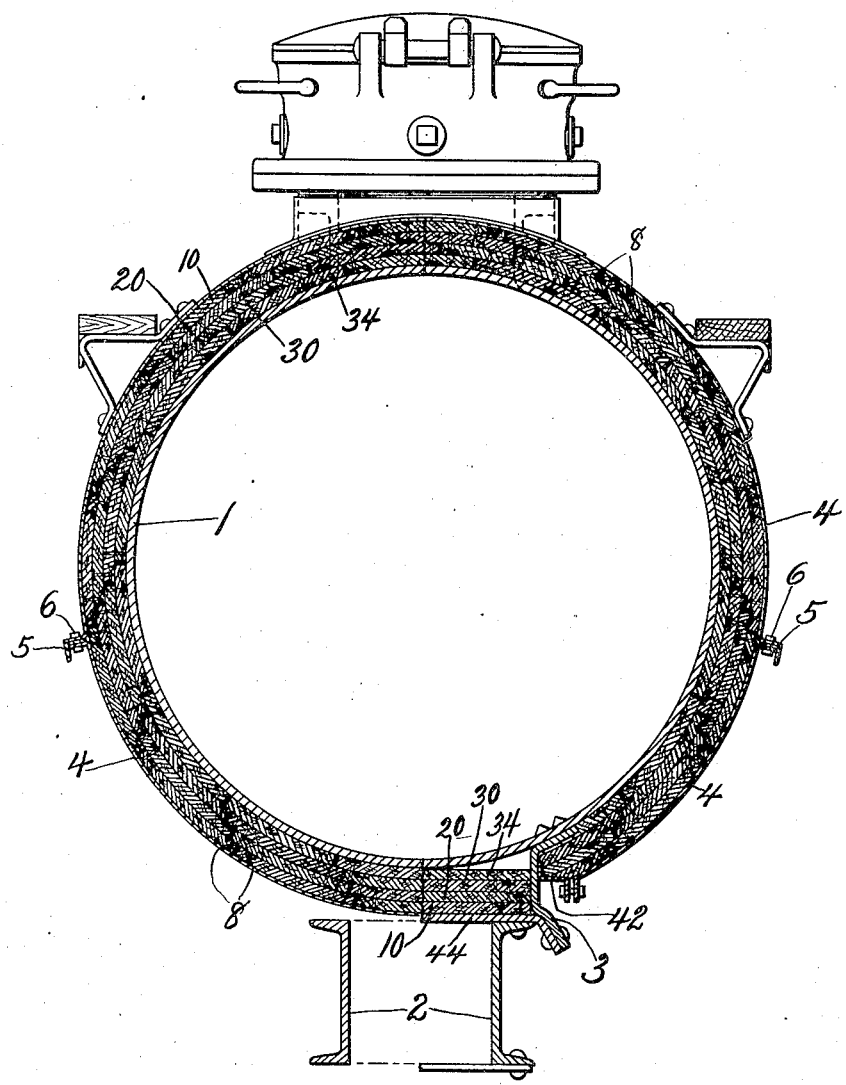

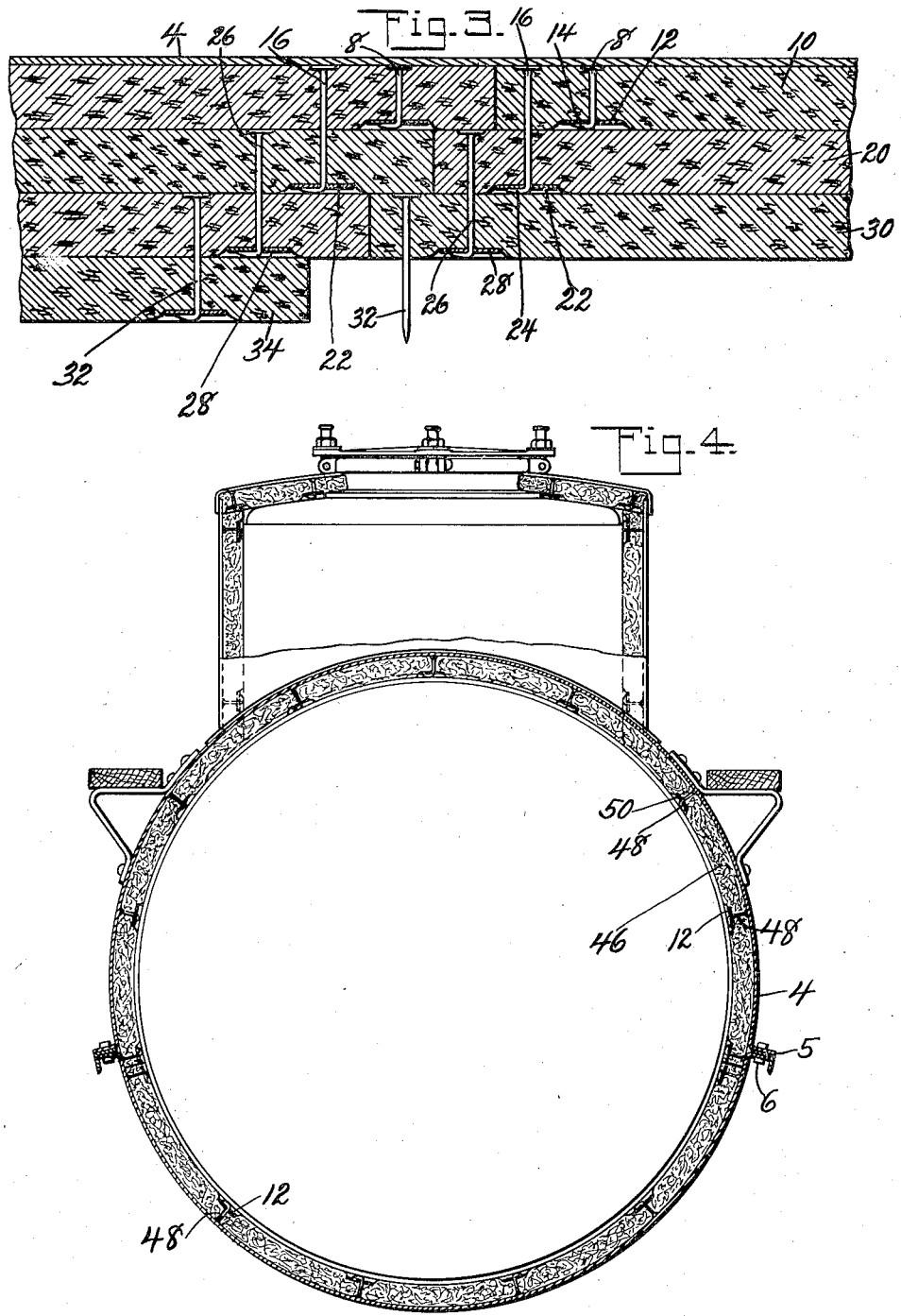

1,685,111

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

INSULATED TANK CAR.

Application filed September 17, 1925. Serial No. 56,992.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a broken view partly in section and partly in elevation of a car tank constructed in accordance with this invention;

Fig. 2 is an irregular transverse section of the car tank shown in Fig. 1, the half at the right being taken through the tank at the anchor adjacent the middle of the tank, while the half at the left is taken at a point beyond the tank anchor;

Fig. 3 is a section drawn to a larger scale of the tank insulation shown in Figs. 1 and 2, and Fig. 4 is a transverse section of a car tank having heat insulating means of modified construction, the tank dome being shown partly in section.

This invention relates to railway tank cars and has as an object to provide an improved heat insulating covering for a car tank which is formed in sections corresponding to and secured to the outer sheathing of the tank and which is applied and removed with the sheathing and secured in position on the tank solely by the sheathing.

It is the main object of this invention to provide a heat insulating covering for a car tank in which heat conductive contact from the sheathing to the tank is prevented.

It is a further object of this invention to provide an insulating covering for a tank, which covering is arranged between the tank body and the sheathing therefor, and which is formed of a plurality of plies interconnected in such a manner as to eliminate heat conductive contact from the sheathing to the tank.

In the drawings a car tank 1 is secured to the sills 2 by the tank anchor 3 and is provided with an outer sheathing 4 which is formed in sections having their meeting edges flanged as at 5 so that the sections may be secured together as by bolts 6.

To the inner surfaces of the sheets forming the sections of the sheathing 4, a multiplicity of nails or other suitable means 8 are secured as by having their heads welded to the sheets. The inward projecting spur fasteners formed by the nails 8 are spaced suitably to securely hold the outer layer 10 of a suitable heat insulating material, such as cork, which is impaled or forced on the nails 8 and secured thereon by having the ends of nails 8 project through the washers 12 and clenched as at 14. Before the layer 10 is placed on the nails 8, nails 16 are inserted in the layer 10 so that when layer 10 is secured to the sheet by the nails 8 the nails 16 are secured in the layer 10 and, projecting beyond the layer 10, receive the second layer 20 which is secured to the first layer by nails 16 projecting through the washers 22 and being clenched as at 24. The layer 20 is in turn provided with nails 26 which receive the next layer 30 and project through washers 28 to secure the layer 30 in position. The layer 30 is in turn provided with nails 32 which secure the next layer 34. These several layers constitute in effect, the plies of a laminated insulation.

The building up of the layers is continued until a suitable thickness of insulation is secured to the sheathing 4, the sections of insulation being secured to the sheathing with their ends overlapping so as to stagger the joints of the various layers and to provide stepped joints at the edges of the sections to permit of the sections being readily assembled with the several sections of insulation secured to one of the sheathing sections interlocked with the several sections of the next adjacent sheathing section. As shown in Fig. 1 the insulation for the tank ends is secured to the sheathing for the ends in the same manner and the layers of insulation are made to overlap at their outer ends so as to provide a suitable joint as shown at 40 with the insulation secured about the body of the sheathing.

It will be apparent that with the laminations connected together as hereinbefore indicated, the fastening elements for such laminations are of less length than the distance between the sheathing and the tank, and further, such fastening elements are spaced from each other in their entirety. It can also be seen that due to such arrangement of the fastening elements with the plies of the insulation, there is no possibility of heat being conducted from the sheathing through such fastening elements to the tank itself.

Beyond the tank anchor the sections of insulation and sheathing have their flanges secured together by the bolts 6 independently of the insulation, the bolts serving to draw the stepped ends of the insulation together to close the joint between the sections of insulation. At the tank anchor the bottom section of sheathing at each side of the tank anchor is secured to an angular or Z-shaped member 42 attached to the tank anchor 3 while throughout the length of the anchor the plate 44 has insulation secured thereto in the manner described which serves to insulate the bottom of the tank.

In the modification shown in Fig. 4 the insulation 46, instead of being formed of a plurality of layers successively applied is formed of a single layer of a suitable insulating material, such as hair felt, which is secured to the sheathing by the nails 48 which are welded to the sheathing and have their outer ends passed through washers 50 and clenched. Where insulation is provided for the dome, the insulating material is secured in the manner described to the sheets forming the dome sheathing, the insulation being arranged to form tight joints along the meeting edges as shown, and the sheets forming the sheathing being secured together in any suitable manner.

It will be noted that, with the sheathing and insulation secured together, the sections of sheathing and insulation can be applied to and removed from the tank as units and in case of damage to a section of the sheathing and insulation, the damaged section may be removed and replaced without materially interfering with the remaining sections. It will also be noted that the insulation will be attached to the sections of the sheathing away from the tank and that the sheathing serves to secure the insulation to the tank.

What is claimed is:

1. In a tank, means insulating the same comprising a plurality of contiguous sheathing sections each having insulating material secured thereto with the ends thereof extended beyond the limits of the sheathing sections whereby to form joints disposed substantially adjacent the meeting edges of the sheathing sections.

2. In a tank, means insulating the same comprising a plurality of contiguous sheathing sections each having laminated insulating material secured directly thereto with the ends of certain of the plies thereof extended beyond the limits of the sheathing sections whereby the insulating material of adjacent sections is interlocked.

3. In a tank, means insulating the same comprising a plurality of sheathing sections arranged side by side and each having insulating material secured thereto with the ends thereof extended beyond the limits of the sheathing sections whereby to form joints disposed substantially adjacent the meeting edges of the sheathing sections, said joints being arranged in staggered relation.

4. In a tank, means insulating the same comprising a plurality of sheathing sections each having laminated insulating material secured thereto with abutting ends of the plies of said laminations staggered with respect to each other.

5. In a tank, a sectional sheathing secured together around the tank, a plurality of inwardly projecting fasteners secured to the inner face of said sheathing, and a laminated insulation for the tank having the plies thereof connected to each other, the first ply of said insulation being impaled upon said fasteners whereby to support the entire insulation with respect to the sheathing and the tank.

6. In a tank, a sectional sheathing secured together around the same, inwardly projecting fasteners secured to the inner wall of said sheathing, insulating material having fasteners extending therethrough impaled on said inwardly projecting fasteners, and additional plies of insulating material connected with said first named insulating material whereby to form a laminated insulation, each ply thereof having means extended therethrough to support the next adjacent ply.

7. A heat insulation for tanks or the like comprising a sectional sheathing of sheets directly secured together around the tank and having connected laminations of heat insulating sections secured directly to the inner surface thereof.

8. A heat insulation structure for use between a tank and a sheathing therefor, comprising laminations having fastening elements for connecting adjacent laminations, the fastening elements of a given lamination being staggered with respect to the fastening elements of adjacent laminations whereby heat conductive contact between the outer and inner sides of said structure is interrupted by insulating material.

9. Means for insulating a tank having a sheathing, comprising a laminated insulation structure secured to the inner face of the sheathing, and fastening elements of less length than the thickness of the complete insulation structure for connecting the adjacent laminations together whereby direct heat contact from the sheathing to the tank is prevented.

10. Means for insulating a tank having a sheathing therefor, comprising a laminated structure secured directly to the inner face of the sheathing, and means connecting adjacent laminations, said connecting means being out of contact with the sheathing and tank whereby heat conductive contact therethrough from the sheathing to the tank is prevented.

11. In a tank, an insulation therefor comprising a sheathing section having fasteners secured to the inner face thereof, and a laminated structure supported by said fasteners, the plies of said laminated structure each having independent fasteners extended therethrough to support an adjacent ply.

12. In a tank, means insulating the same comprising a plurality of contiguous sheathing sections having laminated insulating material secured thereto, the insulating material of adjacent sections being overlapped.

13. In a tank, means insulating the same comprising a plurality of contiguous sheathing sections having laminated insulating material secured thereto, the insulating material of adjacent sections being overlapped forming staggered joints.

14. In a tank, means insulating the same comprising a plurality of contiguous sheathing sections having laminated insulating material secured thereto, the insulating material of adjacent sections being overlapped forming staggered joints substantially adjacent the meeting edges of the sheathing sections.

15. In a tank having a sheathing, means for insulating said tank comprising a laminated structure secured directly to the inner face of the sheathing and having fasteners connecting adjacent laminations only, said fasteners being out of contact with each other whereby heat conductive contact therethrough from the sheathing to the tank is prevented.

In witness whereof I have hereunto set my hand.

VICTOR WILLOUGHBY.